UNITED STATES PATENT OFFICE.

GILBERT RIGG, OF SWANSEA, ENGLAND.

PROCESS OF OBTAINING OXID AND CARBONATE OF ZINC FROM MATERIALS CONTAINING ZINC.

SPECIFICATION forming part of Letters Patent No. 654,804, dated July 31, 1900.

Application filed May 6, 1899. Serial No. 715,855. (No specimens.)

*To all whom it may concern:*

Be it known that I, GILBERT RIGG, a subject of the Queen of Great Britain and Ireland, residing at Bryn road, Swansea, in the county of Glamorgan, Wales, England, have invented a Process for the Production or Separation of Oxid of Zinc and Carbonate of Zinc from Ores and other Materials Containing Zinc, of which the following is a specification.

The object of my invention is to produce or separate oxid of zinc and carbonate of zinc from ores and other materials containing zinc.

I have discovered that when material containing zinc in either the metallic form or as oxid or carbonate, or in two or all of these forms, is leached with a solution of carbonate of ammonia or of carbonate of ammonia and ammonium hydrate there is for any given percentage of ammonia in the solution a certain percentage of carbon dioxid at which the capacity for dissolving zinc possessed by the solution is at a maximum. Any alteration in the amount of carbon dioxid in the solution also causes alteration in its capacity for dissolving zinc if the quantity of ammonia remains constant. If the quantity of carbon dioxid in the solution be increased, the dissolving capacity of the solution is augmented up to a certain point, beyond which any further increase causes the dissolving capacity to again decrease.

The mode of practicing my invention is as follows: When in the material to be treated the zinc to be dissolved according to this invention is not in either the metallic form or that of an oxid or a carbonate, the material is subjected to a preliminary treatment in order to convert the zinc into one or some of said forms. For example, if dealing with sulfid of zinc the same is converted into oxid of zinc by calcination, as well understood. The material or mixture of materials containing metallic zinc or oxid of zinc or carbonate of zinc, or two or all of these, is leached with a solution of ammonium carbonate or ammonium carbonate and ammonium hydrate in order to dissolve any contained metallic zinc, oxid of zinc, and carbonate of zinc, or either, and in order to separate the oxid of zinc and carbonate of zinc, or either, the proportion of carbon dioxid in the solution is changed by additions or subtraction, or the action of the carbon dioxid so present is partially counteracted by introduction of suitable material for which it has an affinity and whereby part of the carbon dioxid is absorbed. By this separating process I can separate oxid of zinc and carbonate of zinc from a solution obtained otherwise than by leaching ores or other materials containing zinc, provided such solution be of the same nature as above described. Having decided on what amount of ammonia is to be used in the solution, it is obviously advantageous to use for leaching purposes that amount of carbon dioxid which will impart the greatest possible dissolving capacity to the solution. As will be evident, this can easily be settled once for all by tests. In the case of two solutions which I have used containing, respectively, 1.2 and 1.4 pounds ammonia ($NH_3$) per gallon I find that the following are the dissolving capacities (expressed in pounds of zinc oxid per gallon) corresponding to the various amounts of carbon dioxid given in the table:

Solution No. 1.—$NH_3$, 1.2 pounds per gallon.

| $CO_2$. | ZnO. |
|---|---|
| Pounds per gallon. | Pounds per gallon. |
| .6 | 1.15 |
| .65 | 1.37 |
| .8 | 1.54 |
| .9 | 1.6 |
| .95 | 1.73 |
| 1.1 | 1.9 (max.) |
| 1.15 | 1.86 |
| 1.3 | 1.74 |
| 1.35 | 1.54 |
| 1.5 | 1.43 |

Solution No. 2.—$NH_3$, 1.4 pounds per gallon.

| $CO_2$. | ZnO. |
|---|---|
| Pounds per gallon. | Pounds per gallon. |
| 1.15 | 2.13 |
| 1.25 | 2.2 |
| 1.3 | 2.3 (max.) |
| 1.4 | 2.12 |
| 1.5 | 2.05 |
| 1.6 | 1.76 |
| 1.75 | 1.26 |

If using solution No. 1, I should employ 1.1 pounds carbon dioxid ($CO_2$) for leaching purposes; if solution No. 2, 1.3 pounds. Then I can either increase the amount of carbon dioxid in the solution by blowing in additional gas or diminish the amount by adding material—for example, lime or caustic soda—with which some of the carbon dioxid can combine. In either case the resulting reduction in the dissolving capacity of the solution is accompanied by precipitation of part of the zinc in solution, as oxid and carbonate. The latter method has the disadvantage that it is difficult to reduce the quantity of carbon dioxid present without adding something which will adulterate the product or the solution. I therefore prefer the former—that is, the precipitation by addition of carbon dioxid. The extent to which the precipitation is to be carried is determined by various considerations. If the carbon dioxid is added to an extent which will cause some of the ammonia to be converted into bicarbonate, there is a tendency for this body to crystallize out, especially when the amount of ammonia present is rather large—say as in solution No. 2. This bicarbonate can, however, always be recovered by washing the precipitate. In the case of a fourteen-per-cent.-ammonia solution (1.4 pounds $NH_3$ per gallon) I might start with about 1.3 pounds carbon dioxid per gallon for leaching and increase to about 1.7 during precipitation. This would allow a fair yield of precipitate without any serious amount of crystallization. The solution is rendered fit for leaching again by removing the excess of carbon dioxid by lime or other suitable means.

Although I have stated certain suitable proportions by way of example, it is to be noted that they are subject to variation, as may prove desirable in actual working.

If it is desired to obtain a pure and white product and the solution has acquired any contamination through iron or copper contained in the zinc-containing material, the iron must be removed from solution by mixing hydrated oxid of tin (metastannic acid) with the solution and allowing the precipitate to subside or by other suitable means, and the copper must be removed by placing metallic zinc in the solution on which the copper deposits.

The term "oxygen compound of zinc" herein used is only intended to comprise oxids and carbonates of that metal.

What I claim is—

1. The process of producing oxid of zinc and carbonate of zinc from zinkiferous material which consists in leaching the zinkiferous material with a solution of ammonia and carbon dioxid wherein the carbon dioxid is in such proportion to the ammonia as to impart to the latter an approximately-maximum zinc-dissolving capacity, as herein set forth.

2. The process of producing oxid of zinc and carbonate of zinc from material containing an oxygen compound of zinc which consists in leaching the zinkiferous material with a solution of ammonia and carbon dioxid wherein the carbon dioxid is in such proportion to the ammonia as to impart to the latter an approximately-maximum zinc-dissolving capacity, as herein set forth.

3. The process of producing oxid of zinc and carbonate of zinc from material containing carbonate of zinc which consists in leaching the zinkiferous material with a solution of ammonia and carbon dioxid wherein the carbon dioxid is in such proportion to the ammonia as to impart to the latter an approximately-maximum zinc-dissolving capacity, as herein set forth.

4. The process of producing oxid of zinc and carbonate of zinc from oxid of zinc and carbonate of zinc which consists in leaching the zinciferous material with a solution of ammonia and carbon dioxid wherein the carbon dioxid is in such proportion to the ammonia as to impart to the latter an approximately-maximum zinc-dissolving capacity, as herein set forth.

5. The process of producing oxid of zinc and carbonate of zinc from zinkiferous material which consists in leaching the zinkiferous material with a solution of ammonia and carbon dioxid wherein the carbon dioxid is in such proportion to the ammonia as to impart to the latter an approximately-maximum zinc-dissolving capacity, as herein set forth and subsequently separating from the solution oxid of zinc and carbonate of zinc contained therein by altering the amount of the active carbon dioxid contained in said solution.

6. The process herein described for producing or separating oxid and carbonate of zinc from material containing an oxygen compound of zinc which consists in leaching the zinkiferous material with a solution of ammonia and carbon dioxid wherein the carbon dioxid is in such proportion to the ammonia as to impart to the latter an approximately-maximum zinc-dissolving capacity, as herein set forth and subsequently separating from the solution oxid of zinc and carbonate of zinc contained therein by altering the amount of the active carbon dioxid contained in said solution.

7. The process of producing oxid of zinc and carbonate of zinc from zinkiferous ores or other materials which consists in leaching the zinkiferous material with a solution of ammonia and carbon dioxid wherein the carbon dioxid is in such proportion to the ammonia as to impart to the latter an approximately-maximum zinc-dissolving capacity, as herein set forth, and subsequently separating from the solution oxid of zinc and carbonate of zinc contained therein by altering the amount of the active carbon dioxid contained in said solution while keeping constant the quantity of ammonia, substantially as described.

8. The process herein described for producing or separating oxid and carbonate of zinc from material containing an oxygen compound of zinc which consists in leaching the said material with a solution of ammonia and carbon dioxid wherein the carbon dioxid is in such proportion to the ammonia as to impart to the latter an approximately-maximum zinc-dissolving capacity, as herein set forth, and subsequently separating from the solution oxid of zinc and carbonate of zinc contained therein by altering the amount of the active carbon dioxid contained in said solution while keeping constant the quantity of ammonia, substantially as described.

9. The process herein described for producing or separating oxid of zinc and carbonate of zinc from zinkiferous ores or other material which consists in leaching the zinkiferous ore or material with a solution of ammonia and carbon dioxid wherein the carbon dioxid is in such proportion to the ammonia as to impart to the latter an approximately-maximum dissolving capacity and subsequently separating from the solution oxid of zinc and carbonate of zinc contained therein by altering the proportion of the active carbon dioxid contained in said solution, removing the oxid of zinc and carbonate of zinc, and rendering the solution fit for leaching again by again establishing the proper proportion of carbon dioxid therein.

10. The process herein described for treating a solution containing ammonium carbonate, oxid of zinc, and carbonate of zinc which consists in separating the oxid of zinc and carbonate of zinc from the solution by altering the proportion of active carbon dioxid in the said solution as set forth.

11. The herein-described process for separating oxid of zinc and carbonate of zinc from zinkiferous material which consists in leaching the said material with a solution of ammonium carbonate and ammonium hydrate containing carbon dioxid in such proportion to the ammonia in the solution as to impart to the solution a maximum zinc-dissolving capacity, as herein set forth, and subsequently separating from the solution oxid of zinc and carbonate of zinc by increasing the proportion of carbon dioxid in the solution while keeping constant the quantity of ammonia, substantially as described.

12. The process herein described of treating a solution containing ammonium carbonate, oxid of zinc and carbonate of zinc by increasing the proportion of carbon dioxid to the ammonia in the said solution as set forth.

Signed at the county borough of Swansea, Wales, this 24th day of April, 1899.

GILBERT RIGG.

Witnesses:
ERNEST BENNETT CLEGG,
WALTER HERBERT CRIGHTON.